US012333919B2

(12) United States Patent
Chan

(10) Patent No.: US 12,333,919 B2
(45) Date of Patent: Jun. 17, 2025

(54) MONITORING SYSTEM

(71) Applicant: KONINKLIJKE PHILIPS N.V., Eindhoven (NL)

(72) Inventor: Kai Kin Chan, Hong Kong (CN)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 86 days.

(21) Appl. No.: 18/038,007

(22) PCT Filed: Nov. 19, 2021

(86) PCT No.: PCT/EP2021/082262
§ 371 (c)(1),
(2) Date: May 20, 2023

(87) PCT Pub. No.: WO2022/112119
PCT Pub. Date: Jun. 2, 2022

(65) Prior Publication Data
US 2023/0419808 A1    Dec. 28, 2023

(30) Foreign Application Priority Data
Nov. 30, 2020 (EP) ..................................... 20210509

(51) Int. Cl.
G08B 21/02 (2006.01)
(52) U.S. Cl.
CPC ................................ G08B 21/0208 (2013.01)
(58) Field of Classification Search
CPC ................................................ G08B 21/0208
See application file for complete search history.

(56) References Cited

U.S. PATENT DOCUMENTS

| | | | | |
|---|---|---|---|---|
| 9,191,629 | B2* | 11/2015 | Lee | H04N 7/18 |
| 10,943,463 | B1* | 3/2021 | Clark | G08B 21/0438 |
| 11,497,884 | B2* | 11/2022 | Fornell | H04B 5/79 |
| 2009/0124301 | A1 | 5/2009 | Raissinia | |

(Continued)

FOREIGN PATENT DOCUMENTS

WO    2017010956 A1    1/2017

OTHER PUBLICATIONS

International Search Report and Written Opinion of PCT/EP2021/082262, dated Mar. 3, 2022.

*Primary Examiner* — Mohamed Barakat

(57) ABSTRACT

A first aspect provides a receiver unit for a monitor system having a first wireless transceiver for communicating with a monitor unit with a first processor, and a second processor at for processing monitoring data. The second processor has a sleep mode to reduce power consumption, and the first processor wakes the second processor from the sleep mode in response to dialogue between the first processor and the monitor unit. The first aspect also provides the monitor system with the receiver unit and the monitor unit. A second aspect provides a monitor system of a receiver unit and a monitor unit, each with a Wi-Fi module. The monitor system has a first mode in which the first and second Wi-Fi modules communicate directly with each other and a second mode in which the first and second Wi-Fi modules communicate with each other via a Wi-Fi access point. The two modes are implemented simultaneously to create two simultaneous logical paths.

17 Claims, 10 Drawing Sheets

(56) References Cited

U.S. PATENT DOCUMENTS

| | | | |
|---|---|---|---|
| 2012/0120857 A1* | 5/2012 | Sudak | H04W 74/0808 |
| | | | 370/328 |
| 2013/0107029 A1* | 5/2013 | Knasel | H04N 7/181 |
| | | | 348/E7.085 |
| 2015/0157263 A1 | 6/2015 | Workman | |
| 2016/0335870 A1* | 11/2016 | Yum | H04L 67/125 |
| 2018/0047273 A1 | 2/2018 | Dejong | |
| 2019/0166536 A1* | 5/2019 | Kim | H04W 36/24 |
| 2021/0118277 A1* | 4/2021 | Napiorkowski | F21V 23/0442 |

* cited by examiner

MONITORING SYSTEM

CROSS-REFERENCE TO PRIOR APPLICATIONS

This application is the U.S. National Phase application under 35 U.S.C. § 371 of International Application No. PCT/EP2021/082262, filed on Nov. 19, 2021, which claims the benefit of European Patent Application No. 20210509.4, filed on Nov. 30, 2020. These applications are hereby incorporated by reference herein.

FIELD OF THE INVENTION

This invention relates to monitor systems, in particular having relay of audio and/or video between a remote monitor and a receiver unit. The invention is for example of interest for baby monitoring systems, in which the remote monitor is a baby unit and the receiver unit is a parent unit.

BACKGROUND OF THE INVENTION

A conventional video baby monitor consists of a baby unit which captures the activities of a baby and a parent unit that display the captured video. Parents use the system to monitor their baby in a remote room.

In an audio only system, the baby unit has a microphone and the parent unit has a speaker. In a video system, the bay unit also has a camera and the parent unit has a display.

The microphone/camera of the baby unit is usually stationary as the baby (from infancy to around age 2 years) typically spends most of their time while being monitored in bed. The parent unit will however be carried around by the parents, while they participate in different activities around the home. Therefore, the parent unit is usually designed to have a built in battery so that the system is still operable while the parents carry out different activities.

Conventional baby monitors use a 2.4 GHz ISM band wireless transceiver with a proprietary communication protocol such as Frequency Hopping Spread Spectrum (FHSS) for example for transmitting audiovisual data. The general characteristic of such technology is that the device has a high transmitting power, high receiving sensitivity and has a low data rate.

The advantage of such an arrangement is thus that the baby monitor can function over a relatively long range such as 300 m, and with low cost.

One disadvantage of this type of system is that the constant handshake of the parent unit and the baby unit requires the processor to process from time to time, which depletes the battery. In some of the operation modes, such as the voice activated (VOX) mode, the battery could still run out in a matter of hours.

A first issue with existing baby monitors is thus the power consumption.

Another disadvantage of the standard type of system is that the system is not able to connect to the Internet. This limit the usage scenarios. Also, since the baby monitor uses the 2.4 GHz ISM band, it is prone to interference from other electronic devices such as Bluetooth devices, DECT phones, Wi-Fi, etc.

A second issue with existing baby monitors is thus the reliability of the data connection.

US 2013/107029 discloses an infant monitoring system which can operate in a local communication session in a peer-to-peer mode over a local network or in a remote mode over a wide area network.

US 2009/124301 discloses a power save mechanism by which mobile stations can establish direct links to avoid the need to transfer data via an access point.

US 2006/335870 discloses a system which determines if a computing device is within range of a monitoring device, so that either a direct RF link can be used or a Wi-Fi channel or mobile telephone network channel can be used.

SUMMARY OF THE INVENTION

The invention is defined by the claims.

According to examples in accordance with a first aspect, there is provided a receiver unit for a monitor system, comprising:
 an output device;
 a first wireless transceiver for communicating with a monitor unit and receiving monitoring data from the monitor unit, the first wireless transceiver having a first processor;
 a second processor for processing the monitoring data for output by the output device,
 wherein the second processor has a sleep mode, and the first processor is adapted to wake the second processor from the sleep mode in response to dialogue between the first processor and the monitor unit.

This receiver unit has two processors. A main processor may be considered to be the second processor, for data processing (e.g. audio and/or image processing). It has a sleep mode, and to wake the second processor from the sleep mode, a first processor, which is part of the wireless transceiver, determines from dialogue with a remote monitor unit when the second processor needs to be woken. In this way, the power consumption of the main processor is reduced. In particular, the processing of network messages is handled by the first processor, in order to determine when such messages need the second processor to be awake.

The receiver unit is for example battery-operated.

The output device for example comprises a speaker and/or a display, and the second processor is for audio and/or image processing.

The receiver unit for example comprises a power control unit for controlling a power mode of the second processor. The power modes for example include at least a sleep mode and an awake (full function) mode. The sleep mode may be a deep sleep mode or a standby mode.

The first and second processors are for example adapted to implement:
 a hand-off function for handing responsibility for processing of received data from the monitor unit from the second processor to the first processor; and
 a regain function for returning responsibility for processing of received data from the monitor unit from the first processor to the second processor.

Thus, the first processor performs processing of data when in the sleep mode, but this processing is carried out by the second processor when it is awake. Thus, the first processor is not simply turning on and off the second processor, but it is instead taking over some of the tasks of the second processor in the sleep mode and returning them to the second processor in the awake mode.

This enables the first processor to run a very simple operating system (OS) and as such enable a very low power consumption when running. The second processor may then be able to run more computationally intensive processes than the first processor, for example a fully fledge Internet Application. By keeping the first processor simple, the wireless module is lower cost, since the first processor may be part of the cost of the wireless module.

The first processor is for example adapted, during the sleep mode, to monitor received delivery traffic and process network messages intended for the monitor unit.

According to this first aspect there is also provided a monitor system, comprising:
the receiver unit defined above; and
a monitor unit comprising:
an input device for generating the monitoring data; and
a second wireless transceiver for communicating with the receiver unit, the second wireless transceiver having a third processor.

This defines the overall system.

The first and second wireless transceivers may comprise any suitable RF module. However, in a preferred implementation, each transceiver comprises a Wi-Fi module. In the case of a baby monitor system, this enables the baby unit and the parent unit to have access to the Internet as well as being able to communicate with each other via a Wi-Fi access point or being able to communicate with each other directly.

In particular, the monitor system may have a first mode in which the first and second wireless transceivers communicate directly with each other and a second mode in which the first and second wireless transceivers communicate with each other via a Wi-Fi access point.

In the first mode, the monitor unit may communicate with the receiver unit using DSSS and in the second mode the monitor unit and the receiver unit communicate with the access point using OFDM. Thus, the longer range of DSSS modulation is used for direct communication, whereas the higher bandwidth of OFDM is used for communication via an access point.

The first and second modes are in particular time-interleaved. In this way, separate network communications are established at the same global time (i.e. interleaved with each other) but with individual data packets at different times to avoid collision and interference.

The first processor is for example adapted to send a sleep request to the monitor unit with a wakeup passcode and to place the second processor into the sleep mode, and the third processor is adapted to send the wakeup passcode back to the receiver unit to instruct awakening of the second processor from the sleep mode.

Thus, an exchange of a passcode is used to place the second processor in the sleep mode, and then to enable the second processor to be awoken from the sleep mode.

The system is for example a video baby monitor, wherein the monitor unit is a baby unit and the receiver unit is a parent unit.

This aspect also provides a method of communicating between a monitor unit and a receiver unit of a monitor system, comprising:
using a first processor of a first wireless transceiver in the receiver unit to process communications from the monitor unit while a second processor of the receiver unit is in a sleep mode;
using first processor to wake the second processor from the sleep mode in response to dialogue between the first processor and the monitor unit; and
receiving monitoring data from the monitor unit and using the second processor for processing the monitoring data.

This method uses a first processor of a transceiver to determine when a second processor should be woken from a sleep mode. This saves power by reducing the use of the second processor.

The method may comprise implementing:
a hand-off function for handing responsibility for processing of received data from the monitor unit from the second processor to the first processor during the sleep mode; and
a regain function for returning responsibility for processing of received data from the monitor unit from the first processor to the second processor when the second processor is woken from the sleep mode.

The method may comprise communicating directly between the first and second wireless transceivers in a first mode, and communicating between the first and second wireless transceivers via a Wi-Fi access point in a second mode.

This aspect also provides a computer program comprising computer program code means which is adapted, when run on processors of the monitoring unit and receiving unit of the system defined above, to implement the method defined above.

According to examples in accordance with a second aspect, there is provided a monitor system, comprising:
a receiver unit, comprising:
an output device;
a first Wi-Fi module having a first wireless transceiver; and
a monitor unit comprising:
an input device; and
a second Wi-Fi module having a second wireless transceiver,
wherein the first wireless transceiver is for communicating with the monitor unit and receiving monitoring from the monitor unit received by the input device and the second wireless transceiver is for communicating with the receiver unit, and
wherein the monitor system has a first mode in which the first and second Wi-Fi modules communicate directly with each other and a second mode in which the first and second Wi-Fi modules communicate with each other via a Wi-Fi access point.

This aspect enables improvement to the indoor connectivity of a connected video monitor such as a baby monitor system. The monitor unit (e.g. baby unit) can for example connect to the Internet through the access point (e.g. a home Wi-Fi router) and at the same time it can connect to the parent unit through the same RF Wi-Fi interface. The parent unit is also setup in such a way that it can connect to the Internet through the access point and at the same time can connect to the baby unit through the same RF Wi-Fi interface.

This implementation thus uses Wi-Fi chipsets to establish two Wi-Fi connections simultaneously and in which one connection is connected to an access point for Internet access and another Wi-Fi connection connects the monitor and receiver for outputting data (e.g. outputting audio and/or displaying video) in the receiver unit. The advantage of such an approach is that there only needs to be one radio frequency interface which reduces cost and complexity of managing the co-existence.

The two connections create two paths (one for each mode) simultaneously, and the system can then select the best path for streaming data such as audiovisual data.

The output device may comprise a speaker and/or a display, the input device may comprise a microphone and/or camera and the first wireless transceiver is for receiving audio and/or video data from the monitor unit. The system may thus be an audio monitor, a video monitor or an audiovisual monitor.

One of the first and second Wi-Fi modules is configured as a virtual network interface for the first mode and one of the first and second Wi-Fi modules is configured as a virtual network interface for the second mode.

As mentioned above, each of the first and second Wi-Fi modules is preferably able to access the Internet using their respective Wi-Fi module. Thus, there are three modes; an indirect communication mode, a direct communication mode and a data access mode using the Internet.

In the first mode, the monitor unit may communicate with the receiver unit using DSSS and in the second mode the monitor unit and the receiver unit communicate with the access point using OFDM. Thus, the longer range of DSSS modulation is used for direct communication, whereas the higher bandwidth of OFDM is used for communication via an access point.

The first and second modes are time-interleaved. In this way, separate network communications are established at the same global time (i.e. interleaved with each other) but with individual data packets at different times to avoid collision and interference. This provide two logical paths: one direct and one through the access point as a relay. By assessing the quality of each path, the best path can be selected to transmit data.

The first Wi-Fi module may comprise a first processor and the receiver unit further comprises a second processor for processing data received from the monitor unit, wherein the second processor has a sleep mode, and the first processor is adapted to wake the second processor from the sleep mode in response to dialogue between the first processor and the monitor unit.

In this way, the power consumption of the second processor is reduced. In particular, the processing of network messages is handled by the first processor, in order to determine when such messages need the second processor to be awake.

A power control unit is for example provided for controlling a power mode of the second processor.

The first and second processors are for example adapted to implement:
  a hand-off function for handing responsibility for processing of received data from the monitor unit from the second processor to the first processor; and
  a regain function for returning responsibility for processing of received data from the monitor unit from the first processor to the second processor.

Thus, the first processor performs processing of data, when in the sleep mode, which is carried out by the second processor when it is awake. Thus, the first processor is not simply turning on and off the second processor, but it is instead taking over some of the tasks of the second processor in the sleep mode and returning them to the second processor in the awake mode.

The first processor is for example adapted, during the sleep mode, to monitor received delivery traffic and process network message intended for the monitor unit.

The system for example comprises a video baby monitor, wherein the monitor unit is a baby unit and the receiver unit is a parent unit.

This aspect also provides a method of communicating between a receiver unit and a monitor unit of a monitor system, comprising:
  in a first mode:
    using a first Wi-Fi module of the receiver unit and a second Wi-Fi module of the monitor unit to communicate directly with each other to transmit data; and
  in a second mode:
    using the first and second Wi-Fi modules to communicate with each other to transmit data via a Wi-Fi access point.

This method provides one direct path and one relay path through the access point. By assessing the quality of each path, the best path can be selected to stream data such as audiovisual data.

The method may comprise configuring one of the first and second Wi-Fi modules as a virtual network interface for the first mode and one of the first and second Wi-Fi modules as a virtual network interface for the second mode.

The method may comprise using the first or second Wi-Fi modules to access the Internet.

In the first mode, the monitor unit may communicate with the receiver unit using DSSS and in the second mode the monitor unit and the receiver unit may communicating with the access point using OFDM.

This aspect also provides a computer program comprising computer program code means which is adapted, when run on processors of the monitoring unit and receiving unit of the system defined above, to implement the method defined above.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
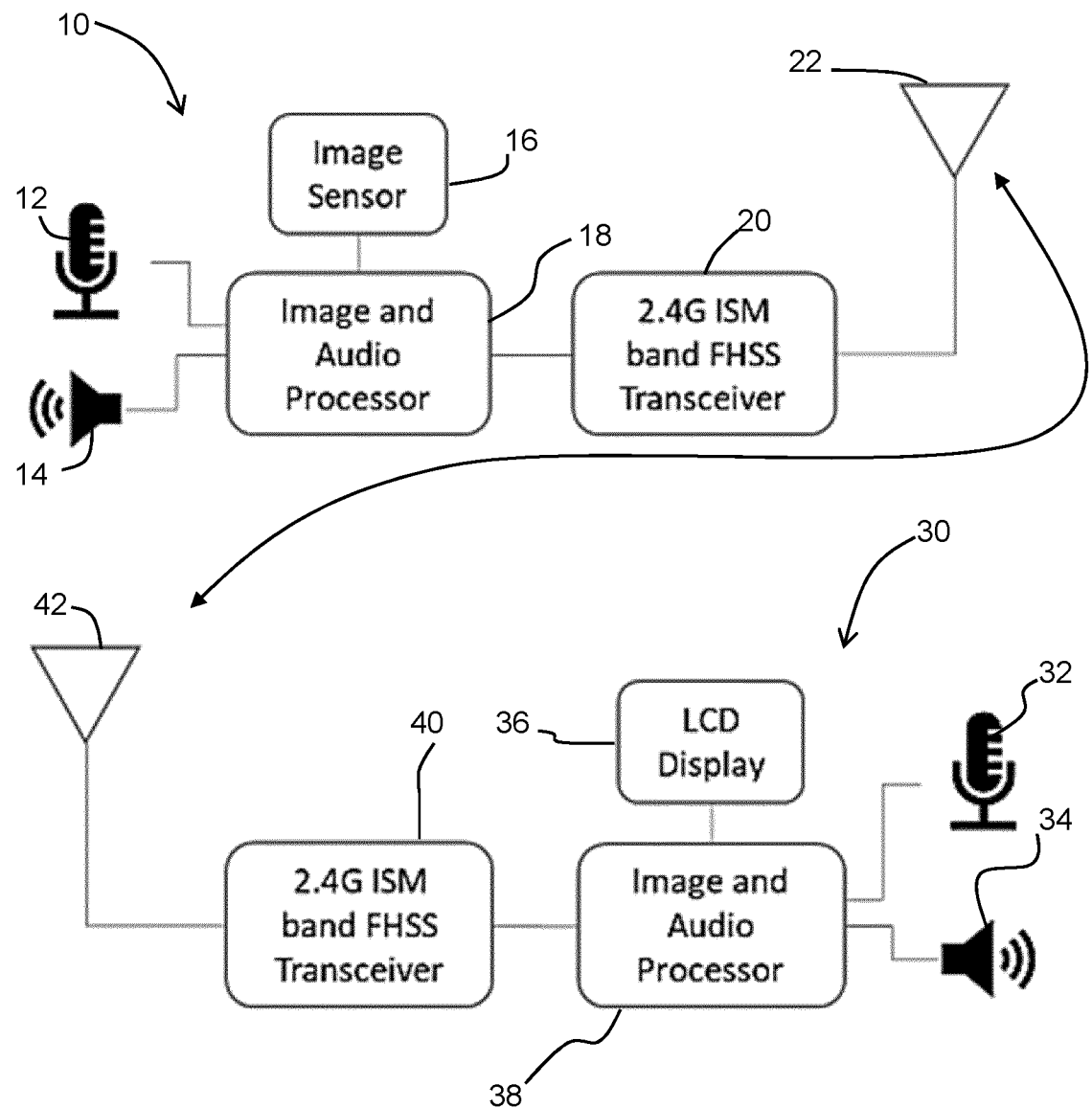
FIG. 1 shows a known baby video monitor system.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

A first aspect provides a receiver unit for a monitor system having a first wireless transceiver for communicating with a monitor unit with a first processor, and a second processor at least e.g. audio and/or video processing, The second processor has a sleep mode to reduce power consumption, and the first processor wakes the second processor from the sleep mode in response to dialogue between the first processor and the monitor unit. The first aspect also provides the monitor system with the receiver unit and the monitor unit.

A second aspect provides a monitor system of a receiver unit and a monitor unit, each with a Wi-Fi module. The monitor system has a first mode in which the first and second Wi-Fi modules communicate directly with each other and a second mode in which the first and second Wi-Fi modules communicate with each other via a Wi-Fi access point. The two modes are implemented simultaneously to create two simultaneous logical paths.

The invention may be applied to audio-only monitoring systems, or video-only systems or audio and video systems, but the invention is described below with reference to a video and audio monitoring system.

FIG. 1 shows a known baby video monitor system, comprising a monitor unit 10, in particular a baby unit, and a receiving unit 30, in particular a parent unit. The parent unit is described as a receiving unit because the primary purpose is to receive and output images and sound from the baby unit. However, the system typically allows two way audio communication, so that the parent unit can also be used to transmit audio to the baby unit. Thus, the term "receiving unit" is used for convenience only, and does not exclude that the parent unit can also be used as a transmitter.

The baby unit 10 comprises a microphone 12, a speaker 14, an image sensor 16 (e.g. a digital camera), and an image and audio processor 18. The microphone and image sensor are examples of input device. The baby unit may have only input devices, but this example also includes an output device in the form of the speaker. The processed image and audio is transmitted by a transceiver 20 which implements a frequency hopping spread spectrum (FHSS) modulation. The modulated signal is transmitted on the 2.4 GHz band using antenna 22.

The parent unit 30 comprises a microphone 32, a speaker 34, a display 36 (e.g. a LCD screen), and an image and audio processor 38. The speaker and display are examples of output device. The monitor unit may have only output devices, but this example also includes an input device in the form of the microphone.

The processed image and audio is received at antenna 42 and provided to a transceiver 40 which implements a frequency hopping spread spectrum (FHSS) demodulation. The parent unit is typically battery operated, although it typically also has an interface to allow connection to the mains for operation from the mains and for recharging.

This arrangement has high transmitting power and hence range, high receiving sensitivity and has a low data rate. However, issues with this system relate to the power consumption, incompatibility with the Internet, and reliability of the data connection.

Figure 2:
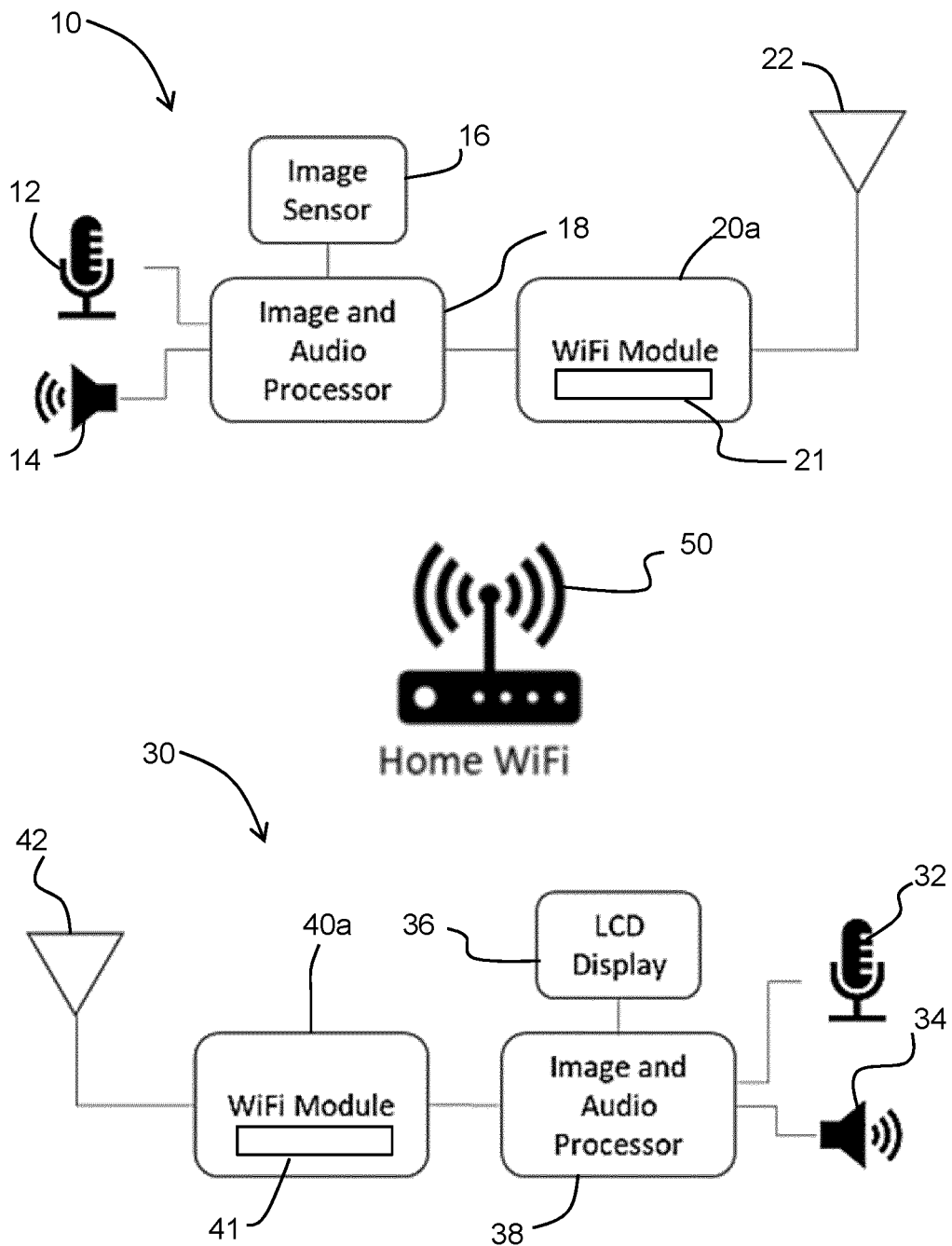
FIG. 2 shows an example of an alternative architecture for a monitor system.

FIG. 2 shows an example of an alternative architecture for a monitor system. The architecture may be applied to any audio and/or video monitoring system, but for convenience it will be described in the context of a baby monitoring system.

The same components are given the same reference numbers as in FIG. 1. Thus, there is a baby unit 10 comprising a microphone 12, a speaker 14, an image sensor 16 (e.g. a digital camera), and an image and audio processor 18. The processed image and audio is transmitted by a transceiver 20a and the processed signal is transmitted on the 2.4 GHz band using antenna 22.

There is also a battery-operated patent unit 30 comprising a microphone 32, a speaker 34, a display 36 (e.g. a LCD screen), and an image and audio processor 38. The processed image and audio is received at antenna 42 and provided to a transceiver 40a.

The two transceivers 20a, 40a each comprise a Wi-Fi module. Thus, the FHSS chipset in each transceiver of FIG. 1 is replaced by Wi-Fi module.

The two transceivers each comprise a respective Wi-Fi processor.

For the purposes of this description, the transceiver 40a of the receiving unit is named the "first transceiver" and it has a first processor 41. The image and audio processor 38 of the parent unit will be named a second processor. The transceiver 20a of the monitoring unit is named the "second transceiver" and it has a third processor 21.

In this way, the system is extended to include an access point 50 (e.g. a home router) of a home Wi-Fi system.

The two Wi-Fi modules 20a, 40a emulate two virtual devices. The arrangement enables the baby unit 10 to establish two Wi-Fi connections simultaneously. One Wi-Fi connection is connected to the home router 50 for Internet access and another Wi-Fi connection is for connection directly to the parent unit via any suitable peer to peer direct connection system (one example is the Wi-Fi Direct standard) for displaying the video content and outputting the audio content at the parent unit 30.

Figure 3:
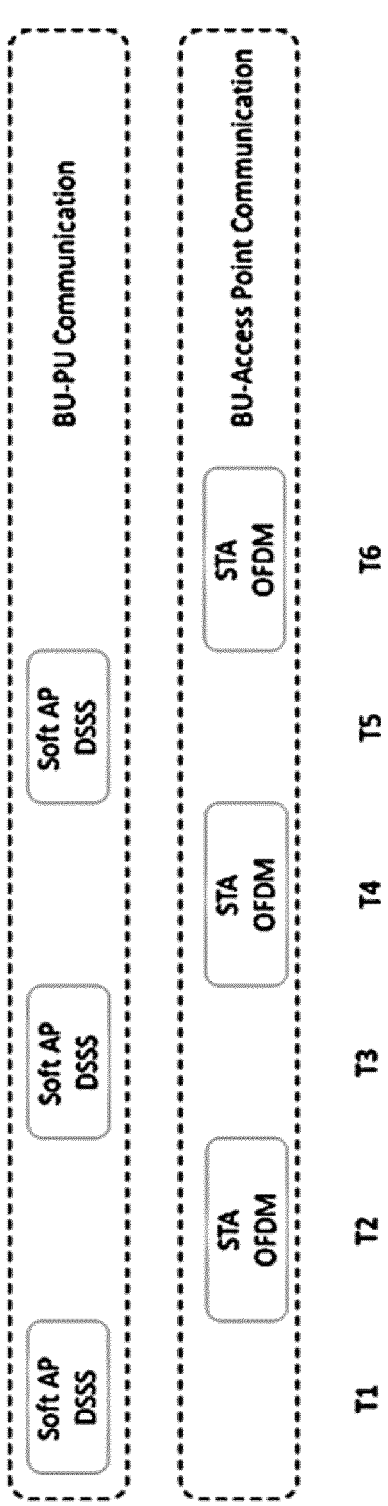
FIG. 3 shows two different communication channels may be used in a time sharing manner by the baby unit.

FIG. 3 shows how the two different communication channels may be used in a time sharing manner by the baby unit. The top part of FIG. 3 shows when there is direct communication between the baby unit and the parent unit using a direct peer to peer Wi-Fi connection. At each odd time interval (T1, T3, T5) communication takes place using a direct sequence spread spectrum (DSSS) modulation approach.

This is for example implemented based on the 2.4 GHz 802.11b standard.

The baby unit functions as a software enabled access point, for use in a Wi-Fi peer to peer connection.

The bottom part of FIG. 3 shows when there is communication between the baby unit and the access point. At each even time interval (T2, T4, T6) communication takes place using an orthogonal frequency division multiplex (OFDM) modulation approach.

This is for example implemented based on the 2.4 GHz 802.11a or 802.11g standards.

FIG. 3 thus shows that in the baby unit 10, the physical layer is shared across the two different communication needs, that is the baby unit and parent unit for local streaming and the baby unit and access point for internet streaming.

The transceiver of the baby unit is in this way configured as two virtual network interfaces at the same time. As a result, the two network interfaces can communicate to the parent unit and to the access point independently.

As shown in FIG. 3, during the time for direct communication (i.e. local streaming), the radio chip physical layer of the baby unit is set to use the DSSS scheme and during the time for Internet streaming (or indirect communication via the access point) the radio chip physical layer is set to use the OFDM scheme. In this way, the local streaming can make use of the higher link budget of DSSS to allow for longer range. The Internet streaming can make use of the higher bandwidth of OFDM to allow for shorter latency and faster transfer speed.

Figure 4:
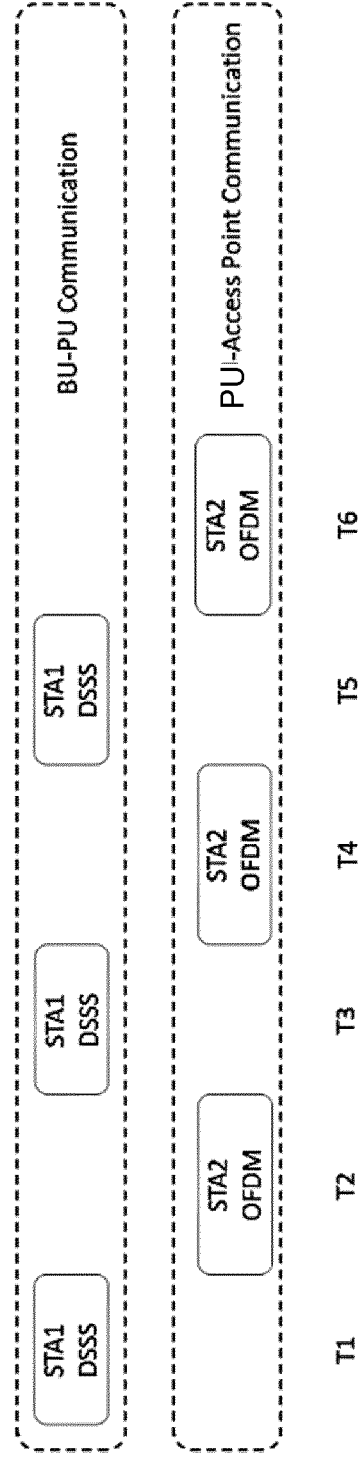
FIG. 4 shows how the two different communication channels may be used in a time sharing manner by the parent unit.

FIG. 4 shows how the two different communication channels may be used in a time sharing manner by the parent unit. The top part of FIG. 4 shows when there is direct communication between the baby unit and the parent unit. Again, at each odd time interval (T1, T3, T5) communication takes place using the direct sequence spread spectrum (DSSS) modulation approach. The parent unit also functions as a software enabled access point.

The bottom part of FIG. 4 shows when there is communication between the parent unit and the access point. At each even time interval (T2, T4, T6) communication takes place using an orthogonal frequency division multiplex (OFDM) modulation approach.

The parent unit functions as station STA1 in the direct communication mode, with communication to the software AP of the baby unit. The parent unit functions as station STA2 in the indirect communication mode, with communication to the home access point 50.

Thus, the physical layer in the parent unit is, in the same way, shared across the two different communication channels.

Also similar to the baby unit, the parent unit physical layer is set to the DSSS scheme during the time when communicating to the baby unit and set to the OFDM scheme during the time communicating to the access point.

Thus, the parent unit and baby unit are able to communicate in a direct mode and indirect (infrastructure) mode at the same time by establishing two communication channels by time sharing the physical layer.

The invention provides the architecture as described above. In addition, the invention provides an approach for reducing power consumption, which may be applied to this architecture or indeed to other architectures.

By reducing the power consumption, a low power parent unit is enabled. In this way, the operating time for a battery operated parent unit is extended.

In the architecture described shown above, this low power operation is enabled by moving part of the processing functionality from the video and audio processor to the Wi-Fi module and hence freeing the image and audio processor from handling non-essential activities, to achieve lower power consumption.

Figure 5:
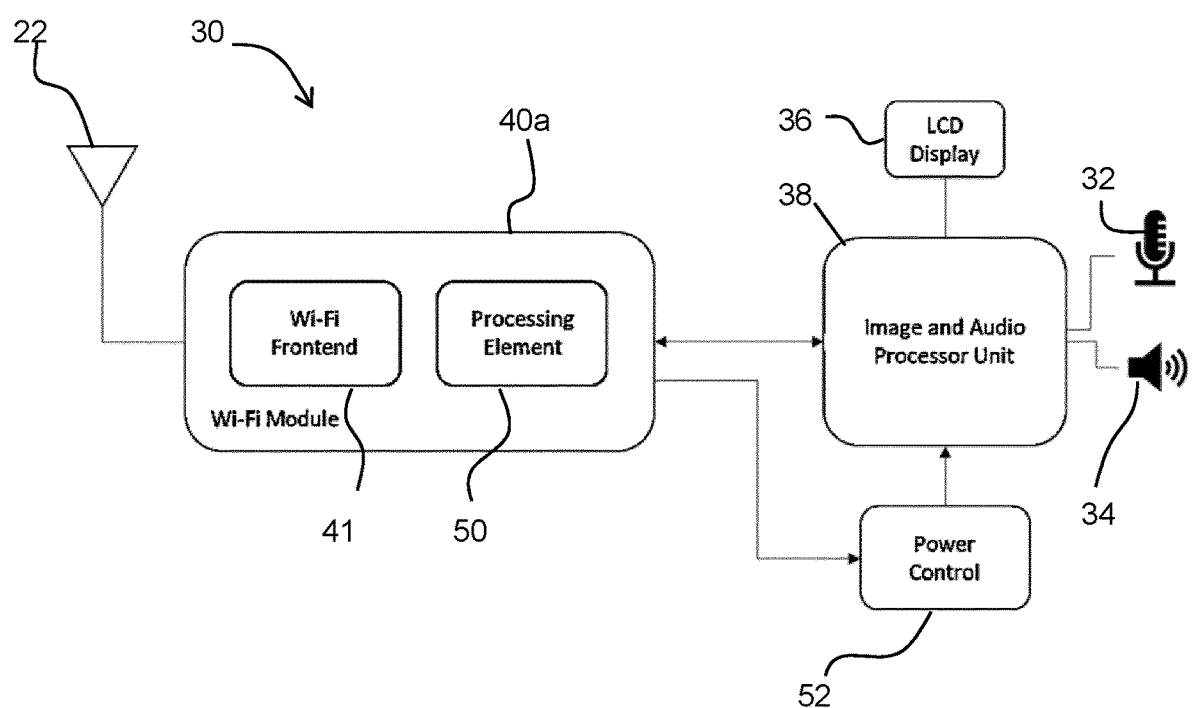
FIG. 5 shows a modified architecture of the parent unit.

FIG. 5 shows a modified architecture of the parent unit 30. The Wi-Fi module 40a comprises the second processor 41, which functions as a Wi-Fi front end, and an additional processing element 50.

An additional power control unit 52 is able to place the second processor 38 in a sleep mode.

The power control unit is outside the processor and it functions as a power supply. When the Wi-Fi module 40a receives a wake up request, it turns on the power supply. The power control implements a specific power up sequence to bring the processor to an operational state or implement a specific power down sequence to bring the processor to a deep sleep state.

By handling the functions of sorting received communications and deciding when the parent unit needs to take action in the processing element (rather than in the main image and audio processor) power is saved. This is because the Wi-Fi module with the processing element has a lower power consumption than the image and audio processor. The processing element in the Wi-Fi module runs a more lean, more simple operating processor and as such is more energy efficient. However, the main image and audio processor has to run a fully fledged internet application, video playback, etc. so is a more power hungry. By turning off the more power hungry processor and using the more lightweight processor, the system saves power.

When in the awake mode, the image and audio processing unit performs processing of network messages because it is running the operating system that has all the network libraries running (such as RTSP, NTP, HTTP, DHCP, MQTT, etc.). In the Wi-Fi module, there is not sufficient resource (memory space, processing power, etc.) to implement a full network library.

This sleep mode is a standby or deep sleep mode. When the baby unit 10 requires attention of the parent unit, the baby unit can instruct the parent unit to be awoken from the sleep mode so that it is able to process alerts and notifications from the baby unit. The instruction to awaken the parent unit is handled by the processing element 50.

By introducing this approach, the parent unit may have an operation time extended by a factor of 2 more compared to previous designs.

The additional processing element 50 of the Wi-Fi module 40a is a low power processor which is designed specifically to process certain types of packets received from the baby unit. In combination with the power control unit 52, a sleep and wakeup mechanism is implemented to allow the main (second) processor 38 of the parent unit to enter a deep sleep mode and wakeup to process necessary data.

This architecture means that some of the network packet processing is offloaded from the second processor 38 to the Wi-Fi module 40a, so that the image and audio processor unit can be put into the standby or deep sleep mode, In order to control the sleep mode and wake up from the sleep mode, a hand-off and regain control mechanism is provided. During a state where no data is required to be transferred between the baby unit and parent unit, the image and audio processor 38 instructs the Wi-Fi module 40a to enter a Wi-Fi multimedia (WMM) power saving mode, and then hands off the network processing to the processing element 50 in the Wi-Fi module. The processing element 50 then monitors the Delivery Traffic Indication Messages and processes any network message that is to be sent to the parent unit.

There could be a lot of unwanted network traffic that could be sent to the parent unit. For example, in the case that there are multiple devices sitting on the same network, there could be discovery messages from one particular device sent to all other devices in the network. Therefore, the processing element 50 filters those network packets and prevents the parent unit from waking up when not needed.

The additional processing element 50 in the Wi-Fi module is thus used to hand over and regain control and to power off and power on the video and image processor by controlling the power control unit 52.

One way to implement this function is for the parent unit to send a sleep request with a wakeup pass code to the baby unit. When the baby unit has to get the attention of the parent unit, the baby unit sends the wakeup pass code to the parent unit to regain the attention of the parent unit.

Figure 6:
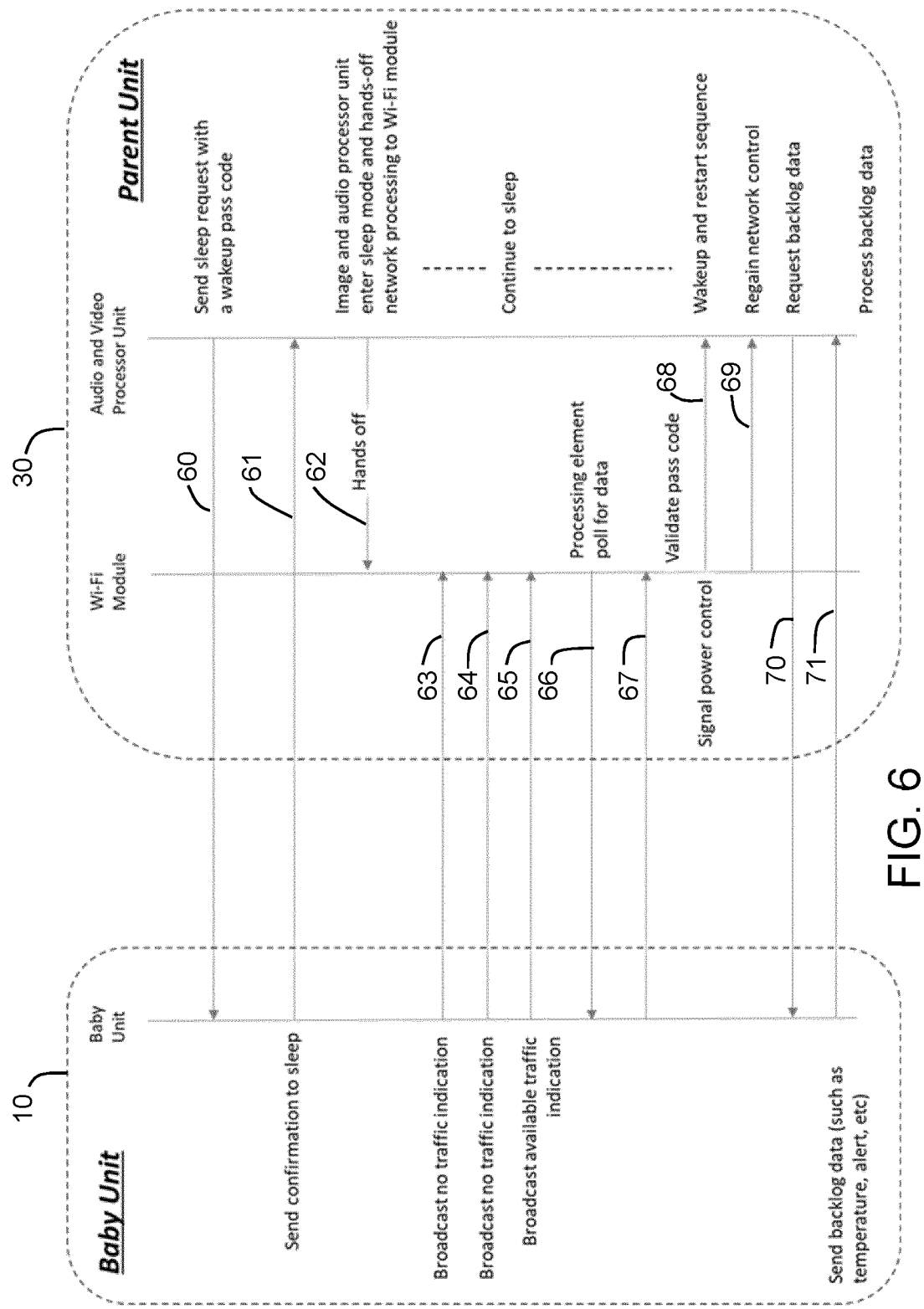
FIG. 6 shows a process flow for implementing a low power mode.

FIG. 6 shows the process flow, with time running from top to bottom.

The first message 60 is a sleep request sent from the second (main) processor 38 of the parent unit to the baby unit. The sleep request includes a wakeup pass code.

The baby unit responds with a confirmation message 61 that the second processor 38 can enter the sleep mode.

The second processor then enters the sleep mode and hands off processing responsibility to the processing element 50 in the Wi-Fi module by message 62.

Two broadcasts 63, 64 from the baby unit are shown but which do not include traffic indications for the parent unit, so do not need the parent unit to be woken from the sleep state. These broadcasts are processed by the processing element 50 and do not result in waking of the second processor from the sleep mode.

A next broadcast 65 has an indication that there is traffic for the parent unit. The processing elements polls the baby unit with message 66, requesting the wakeup pass code. The baby unit responds with the pass code with message 67, which is validated by the processing element.

The processing element then instructs the power control unit to wake up the second processor, by message 68, and the second processor subsequently regains network control as represented by arrow 69.

The second processor then requests backlog data from the baby unit by message 70, which is for example sensor data which was recorded while the second processor was in sleep mode. The backlog data (such as temperate information, or alert notifications) are sent to the parent unit by message 71.

In this way, the parent unit is able to enter a very low power state and therefore can be used for extended period of time.

The architecture explained above also improves the connectivity between the baby unit and the parent unit. This will be discussed further below.

As explained above, there are two modes; a first mode in which the first and second Wi-Fi modules communicate directly with each other and a second mode in which the first and second Wi-Fi modules communicate with each other via a Wi-Fi access point.

Figure 7:
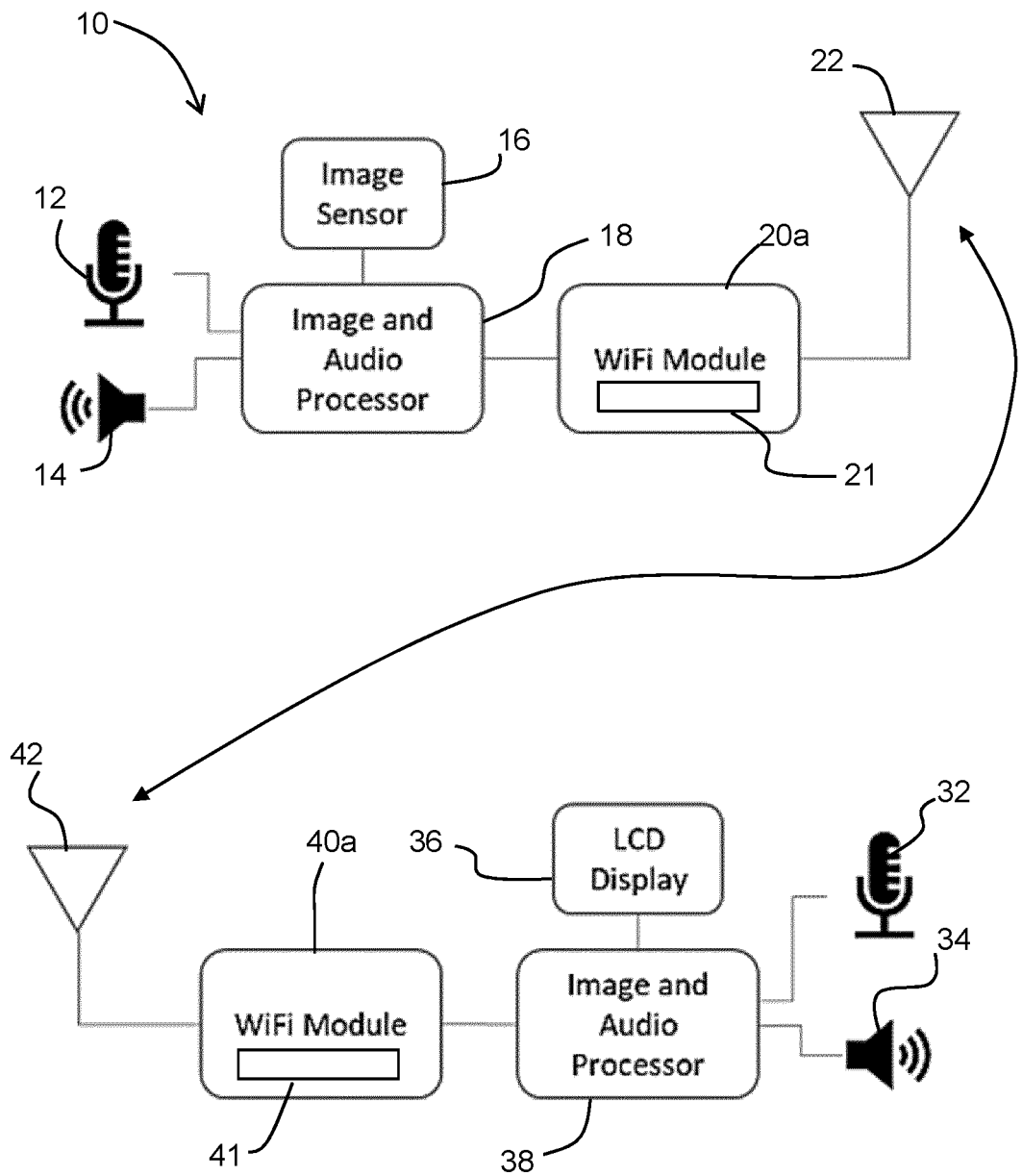
FIG. 7 shows the first mode of the architecture of FIG. 2.

FIG. 7 shows the first mode, in which no use is made of the Wi-Fi access point.

Figure 8:
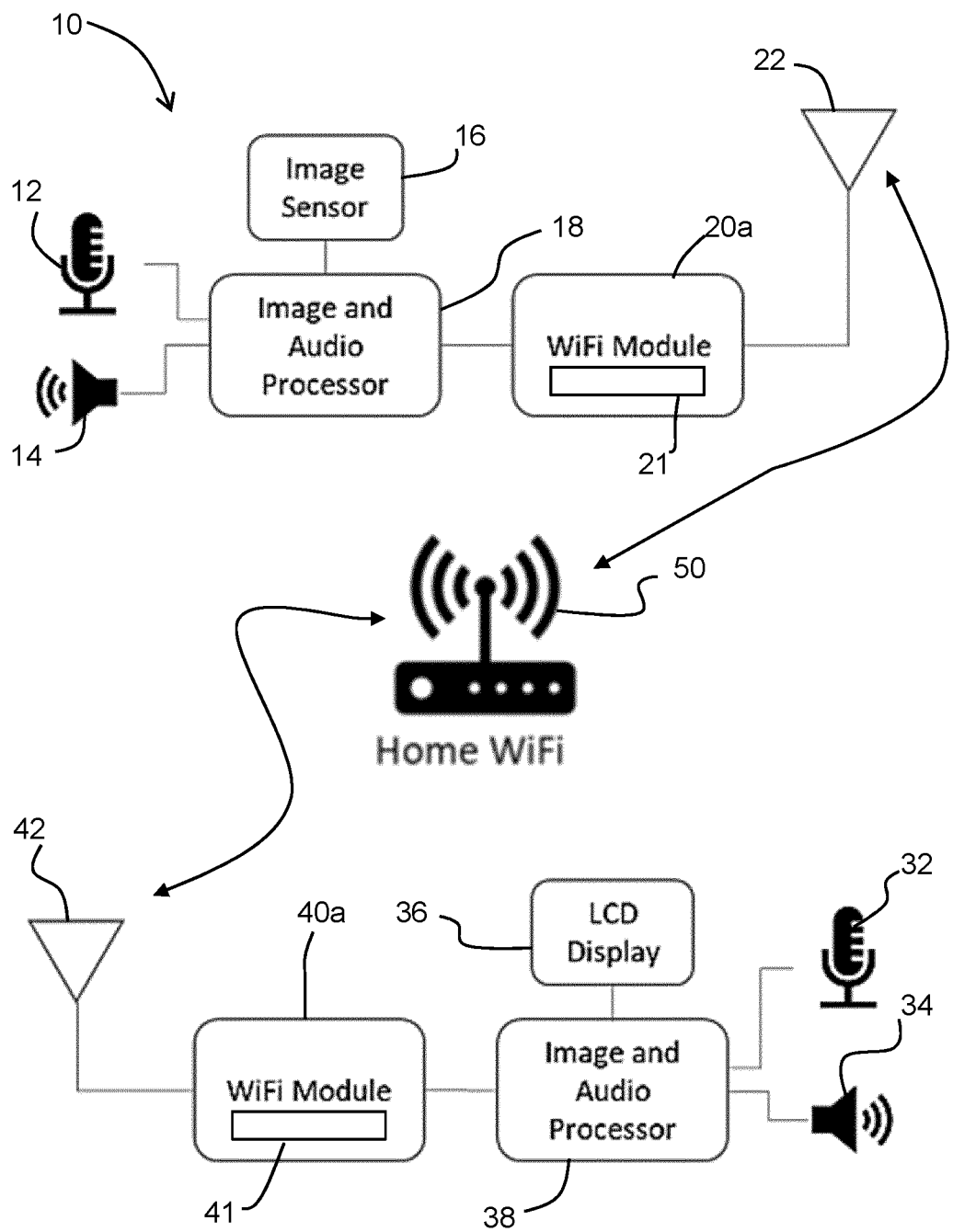
FIG. 8 shows the second mode of the architecture of FIG. 2.

FIG. 8 shows the second mode, in which the communication is via the Wi-Fi access point 50.

There is for example a single access point 50 in a home environment. The indoor connectivity is improved by using the access point. The access point is also connected to the Internet which enables the baby unit to stream video to the Internet (as a third mode), although this is not part of the communication between the receiver unit and the monitor unit as described above.

The two different modes mean that the parent unit and baby unit both emulate two network interfaces, so that the connections (one for each mode) can be made simultaneously. The direct communication scheme (the first mode) uses connections having a modulation scheme that gives the best link budget that covers the longest possible range. The indirect communication scheme (the second mode) through a home access point (router) leverages the possible Wi-Fi infrastructure that the user may have such as Wi-Fi extender, Wi-Fi mesh, etc. The overall system thus achieves the best possible direct link performance and best indoor coverage.

The use of two communication channels means that the system can make use of the home Wi-Fi settings if this gives better performance than the local communication links. Technology such as Wi-Fi extenders and Wi-Fi mesh networks are able to enhance the Wi-Fi coverage in the home environment. A user is typically likely to have Wi-Fi coverage in the spot where their usual activities take place, so by leveraging the Wi-Fi coverage, the user should be able to cover most of the area in which the user is active.

The procedures for setting up the dual communication channels and the switching of the different communication channels will now be described.

Figure 9:
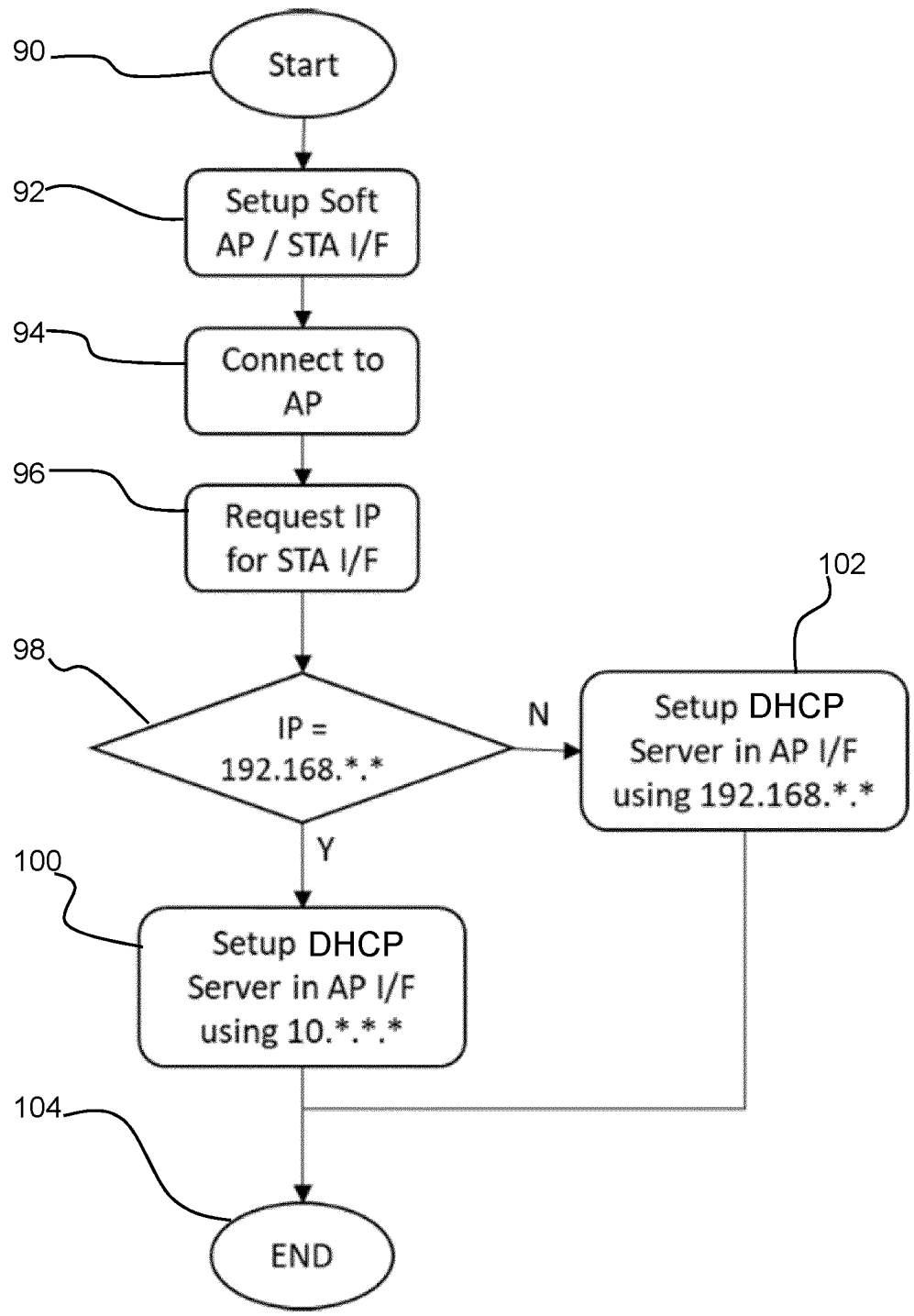
FIG. 9 is a flow diagram to show how the baby unit network interface is set up.

FIG. 9 is a flow diagram to show how the baby unit network interface is set up.

The process starts in step 90.

In step 92, the baby monitor sets up a software access point and a Wi-Fi station (STA) for communicating with the home access point. The software access point is used by a device trying to connect to another device via a direct peer to peer connection to remove the need of a physical access point. The devices usually "negotiate" which device sets up the software access point.

The station STA is for communicating with an access point, in this case, the home access point.

Since the baby unit has two different roles in the network interface, to avoid conflict in the two IP address of the two network interfaces, the baby unit has to first connect to the home access point AP in step 94.

In step 96 the IP address is requested for the baby unit for enabling the direct peer to peer mode. The baby unit has an "AP I/F enable" function to enable the (AP interface) peer to peer Wi-Fi connection.

It is verified in step 98 if DHCP is already set up. DHCP is "The Dynamic Host Configuration Protocol", used by Internet Protocol (IP) networks, whereby a DHCP server dynamically assigns an IP address and other network configuration parameters to each device on the network, so they can communicate with other IP networks.

If the IP address starts with 192.168, then a DHCP is set up with an IP address starting with 10.* in step 100. The Soft AP is thereby restarted in step 100 in order for the parent unit to re-initiate a DHCP request to properly setup the IP addresses.

If the IP address does not start with 192.168, then a DHCP is set up using 192.162.*.* in step 102.

Figure 10:
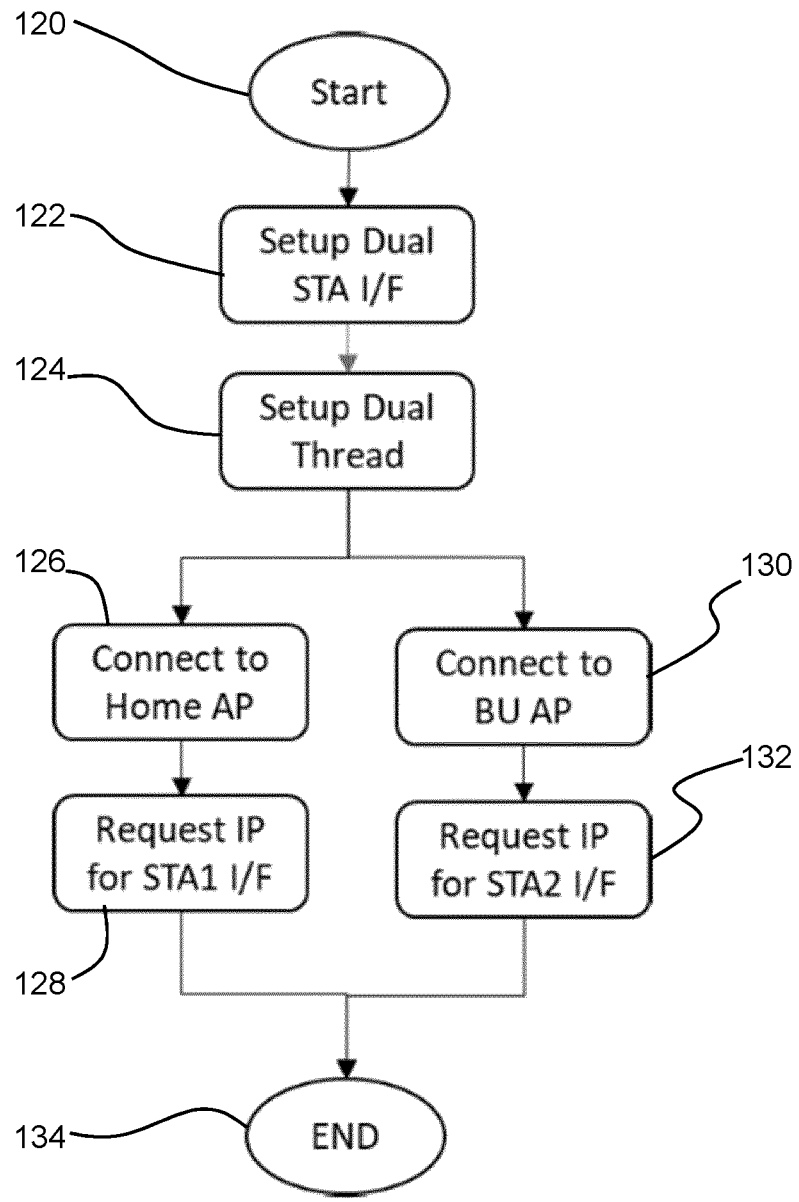
FIG. 10 is a flow diagram to show how the parent unit network interface is set up.

FIG. 10 is a flow diagram to show how the parent unit network interface is set up.

The process starts in step 120.

For the parent unit there are two Station roles (STA1 and STA2), and the setup process is much simpler. The software only needs to setup two communication channels (threads) and each thread sends a DHCP request to the corresponding AP network.

In step 122 the dual STA roles are set up. One station STA1 communicates with the software access point of the baby unit and the other STA2 communicates with the home access point (see FIG. 4).

In step 124 the dual thread is set up.

In one thread, connection is made to the access point in step 126 and an IP address request for STA1 is made in step 128.

In the other thread, connection is made to the baby unit in step 130 and an IP address request is made in step 132.

The process ends in step 134.

Figure 11:
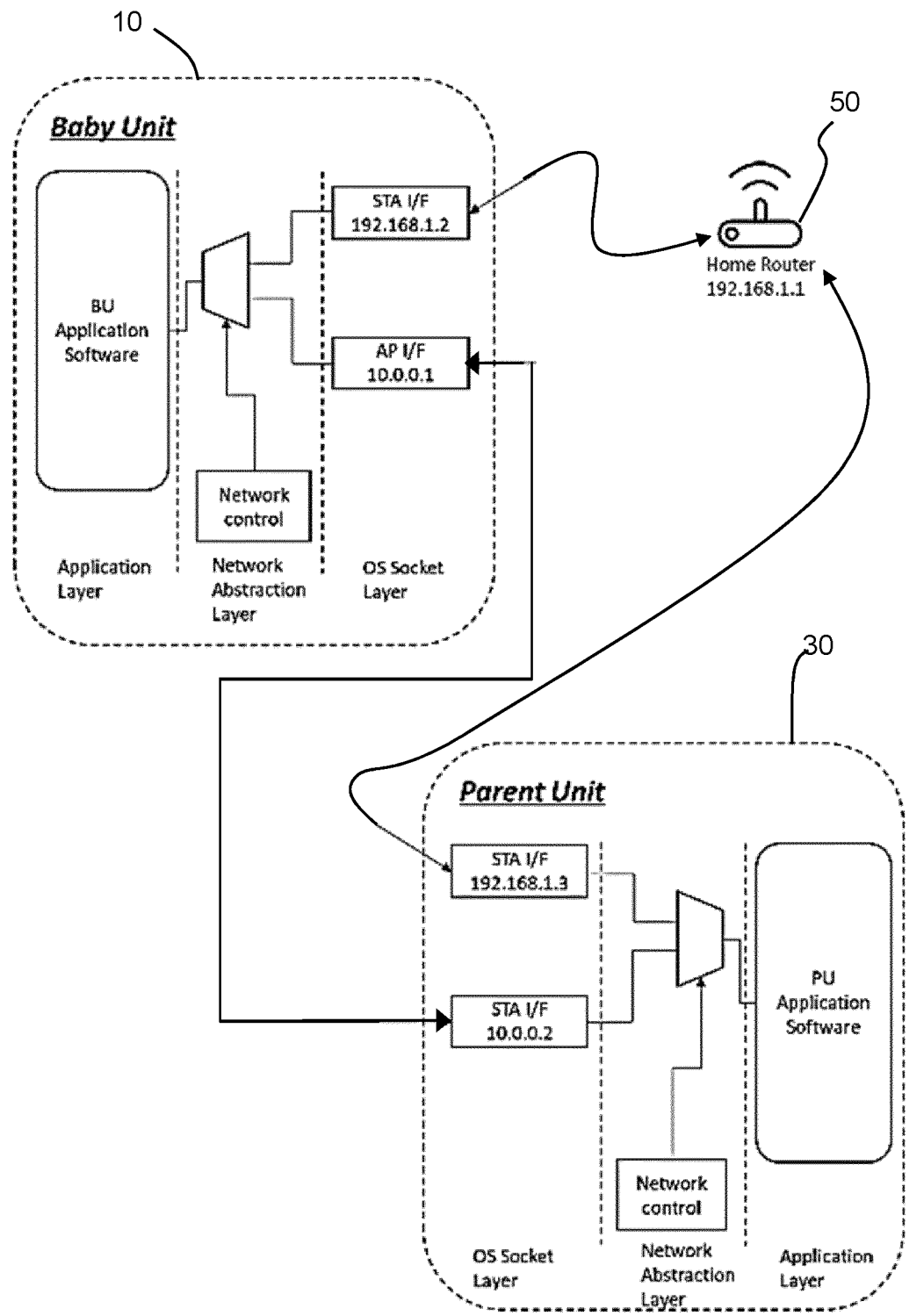
FIG. 11 shows the baby unit and parent unit communication logic.

FIG. 11 shows the baby unit and parent unit communication logic.

The baby unit 10 has set up a software access point (IP—10.0.0.1) which connects directly with a station PU-STA1 of the parent unit 30 (IP—10.0.0.2). This is done by a peer to peer connection.

The baby unit 10 has also set up a station BU-STA (IP—192.168.1.2) which communicates with the home access point 50. The parent unit 30 also has a station PU-STA2 (IP—192.168.1.3) which also communicates with the home access point 50 (router). Thus, they can communicate via an intermediary (the home access point).

FIG. 11 shows a logical view of the two communication channels and how it relates to the application software in the baby unit and parent unit. The applications use a single interface to communicate and the network control unit determines which route to use. The firmware is separated into 3 different layers:

The application layer relates to the basic functionality of the video baby monitor.

The network abstraction layer provides a single interface to the application layer and at the same time controls the actual path being used in the lower layers.

The OS level socket layers provide the physical access to each of the paths.

In order to facilitate the ability to minimize radiation emitted from the baby unit, an evaluation of the link quality may be carried out by the parent unit. The parent unit may for example periodically send out a stream of packets to the baby unit and the baby unit will be in receive mode most of the time thus minimizing radiation. The parent unit will collect data in the process such as packet loss rate, latency, etc. to estimate the link quality and select the best possible link for video transmission.

In this way, a dynamic switching method may be used to choose and select the best communication channel to be used for streaming the audio-visual data.

In the examples above, the baby unit is set up as the software aces point, but it could equally by the parent unit.

The power saving function is explained with reference to the Wi-Fi module architecture. However, the same approach may be applied to other RF transceiver modules.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

A single processor or other unit may fulfill the functions of several items recited in the claims.

The mere fact that certain measures are recited in mutually different dependent claims does not indicate that a combination of these measures cannot be used to advantage.

A computer program may be stored/distributed on a suitable medium, such as an optical storage medium or a solid-state medium supplied together with or as part of other hardware, but may also be distributed in other forms, such as via the Internet or other wired or wireless telecommunication systems.

If the term "adapted to" is used in the claims or description, it is noted the term "adapted to" is intended to be equivalent to the term "configured to".

Any reference signs in the claims should not be construed as limiting the scope.

The invention claimed is:

1. A monitor system, comprising:
   a receiver unit, comprising:
     an output device;
     a first Wi-Fi module having a first wireless transceiver; and
   a monitor unit comprising:
     an input device; and
     a second Wi-Fi module having a second wireless transceiver,
   wherein the first wireless transceiver is for communicating with the monitor unit and receiving monitoring data from the monitor unit received by the input device and the second wireless transceiver is for communicating with the receiver unit, and
   wherein the monitor system has a first mode in which the first and second Wi-Fi modules communicate directly with each other and a second mode in which the first and second Wi-Fi modules communicate with each other via a Wi-Fi access point, wherein the first and second modes are time-interleaved.

2. The system of claim 1, wherein the output device comprises a speaker and/or a display, the input device comprises a microphone and/or camera, and the first wireless transceiver is for receiving audio and/or video data from the monitor unit.

3. The system of claim 1, wherein one of the first and second Wi-Fi modules is configured as a virtual network interface for the first mode and one of the first and second Wi-Fi modules is configured as a virtual network interface for the second mode.

4. The system of claim 1, wherein each of the first and second Wi-Fi modules is able to access the Internet using their respective Wi-Fi module.

5. The system of claim 1, wherein in the first mode, the monitor unit communicates with the receiver unit using direct sequence spread spectrum (DSSS) and in the second mode the monitor unit and the receiving unit communicates with the access point using orthogonal frequency division multiplex (OFDM).

6. The system of claim 1, wherein the first Wi-Fi module comprises a first processor and the receiver unit further comprises a second processor for processing data received from the monitor unit, wherein the second processor has a sleep mode, and the first processor is adapted to wake the second processor from the sleep mode in response to dialogue between the first processor and the monitor unit.

7. The system of claim 6, comprising a power control unit for controlling a power mode of the second processor.

8. The system of claim 6, wherein the first and second processors are adapted to implement:
   a hand-off function for handing responsibility for processing of received data from the monitor unit from the second processor to the first processor; and
   a regain function for returning responsibility for processing of received data from the monitor unit from the first processor to the second processor.

9. The system of claim 8, wherein the first processor is adapted, during the sleep mode, to monitor received delivery traffic and process network message intended for the monitor unit.

10. The system of claim 1, comprising a video baby monitor, wherein the monitor unit is a baby unit and the receiver unit is a parent unit.

11. A method of communicating between a receiver unit and a monitor unit of a monitor system, comprising:
   in a first mode:
     using a first Wi-Fi module of the receiver unit and a second Wi-Fi module of the monitor unit to communicate directly with each other to transmit data; and
   in a second mode:
     using the first and second Wi-Fi modules to communicate with each other to transmit at least data via a Wi-Fi access point,
   wherein the first and second modes are time-interleaved.

12. The method of claim 11, comprising configuring one of the first and second Wi-Fi modules as a virtual network interface for the first mode and one of the first and second Wi-Fi modules as a virtual network interface for the second mode.

13. The method of claim 11, comprising using the first or second Wi-Fi modules to access the Internet.

14. A monitor system, comprising:
- a receiver, comprising:
  - a first wireless transceiver; and
- a monitor comprising:
  - a second wireless transceiver,
- wherein the first wireless transceiver is for communicating with the monitor and receiving monitoring data from the monitor and the second wireless transceiver is for communicating with the receiver, and
- wherein the monitor system has a first mode in which the first and second wireless transceivers communicate directly with each other and a second mode in which the first and second wireless transceivers communicate with each other via a Wi-Fi access point, wherein the first and second modes are time-interleaved.

15. The system of claim 14, wherein the receiver includes at least one of a speaker and a display, the monitor comprises at least one of a microphone and a camera, and the first wireless transceiver is for receiving audio and/or video data from the monitor.

16. The system of claim 14, wherein one of the first and second wireless transceivers is configured as a virtual network interface for the first mode and one of the first and second wireless transceivers is configured as a virtual network interface for the second mode.

17. The system of claim 14, wherein in the first mode, the monitor communicates with the receiver using direct sequence spread spectrum (DSSS) and in the second mode the monitor and the receiver communicates with the access point using orthogonal frequency division multiplex (OFDM).

* * * * *